(12) United States Patent
Mainzer

(10) Patent No.: US 8,800,601 B2
(45) Date of Patent: Aug. 12, 2014

(54) INSERTION AND REMOVAL OF INFLATABLE PIPELINE FLOW STOPPER BAGS

(75) Inventor: Jeffrey William Mainzer, Cary, IL (US)

(73) Assignee: Operations Technology Development, NFP, Des Plaines, IL (US)

( * ) Notice: Subject to any disclaimer, the term of this patent is extended or adjusted under 35 U.S.C. 154(b) by 294 days.

(21) Appl. No.: 13/357,027

(22) Filed: Jan. 24, 2012

(65) Prior Publication Data
US 2013/0186477 A1    Jul. 25, 2013

(51) Int. Cl.
| F16L 55/12 | (2006.01) |
| F16K 7/10 | (2006.01) |
| F16L 55/134 | (2006.01) |
| F16L 55/124 | (2006.01) |

(52) U.S. Cl.
CPC .................. *F16K 7/10* (2013.01); *F16L 55/134* (2013.01); *F16L 55/124* (2013.01)
USPC .............. 138/93; 138/97; 138/94; 137/15.08; 137/15.15; 137/317

(58) Field of Classification Search
CPC ........ F16K 7/10; F16L 55/134; F16L 55/124; F16L 55/128
USPC ............. 138/93, 97, 94; 137/15.08, 317, 318, 137/15.15
See application file for complete search history.

(56) References Cited

U.S. PATENT DOCUMENTS

| 1,760,750 | A | 5/1930 | Goodman |
| 1,946,138 | A | 2/1934 | Gardner |
| 3,842,864 | A | 10/1974 | Reigel et al. |
| 4,155,373 | A | 5/1979 | DiGiovanni |
| 4,492,095 | A | * 1/1985 | Brister .............................. 62/293 |
| 5,439,032 | A | 8/1995 | Petrone |
| 5,462,077 | A | * 10/1995 | Cohen et al. ............... 137/15.08 |
| 5,511,578 | A | 4/1996 | Wagner |
| 5,590,676 | A | 1/1997 | Wagner |
| 5,778,919 | A | 7/1998 | Petrone |
| 5,791,364 | A | * 8/1998 | Petrone ....................... 137/15.15 |
| 5,934,304 | A | 8/1999 | Peterson et al. |
| 6,446,662 | B1 | 9/2002 | Wagner |
| 7,886,773 | B2 | 2/2011 | Mainzer |
| 2013/0048130 | A1 * | 2/2013 | Lundman ......................... 138/93 |

FOREIGN PATENT DOCUMENTS

DE          3508591 A  *  9/1986

* cited by examiner

*Primary Examiner* — Patrick F Brinson
(74) *Attorney, Agent, or Firm* — Pauley Petersen & Erickson

(57) ABSTRACT

An apparatus for fluid flow control, including flow stoppage, in a pipe having a saddle fitting with an axially extending outer launch tube and a coaxially aligned inner launch tube longitudinally split into two inner launch tube halves disposed within the axially extending outer launch tube. At least one inflatable flow stopper bag is disposed within the inner launch tube for stopping flow of a fluid through the pipe with which the saddle fitting is connected. An inner launch tube control rod for manipulating each of the inner launch tube halves during the inflatable stopper insertion and removal processes is connected with each of the inner launch tube halves, and a flow stopper bag control rod for manipulating the inflatable flow stoppers is connected with each of the inflatable flow stopper bags.

16 Claims, 4 Drawing Sheets

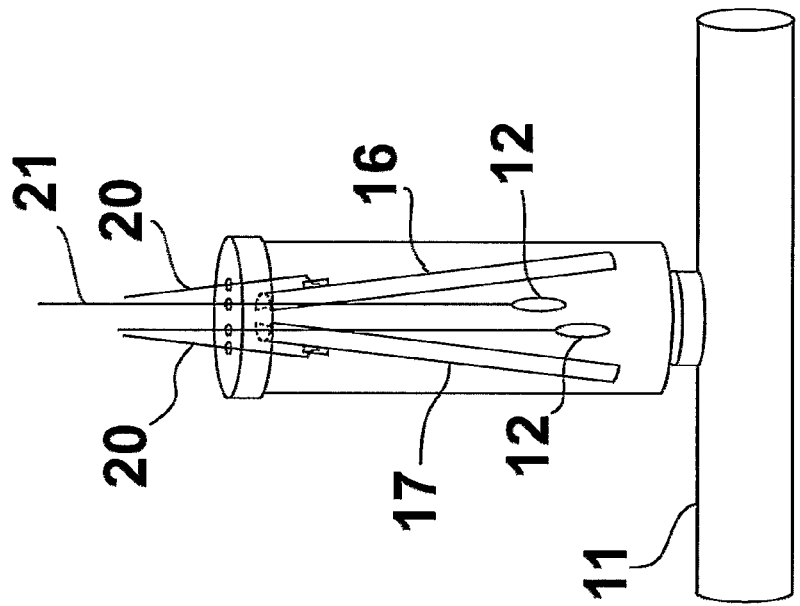
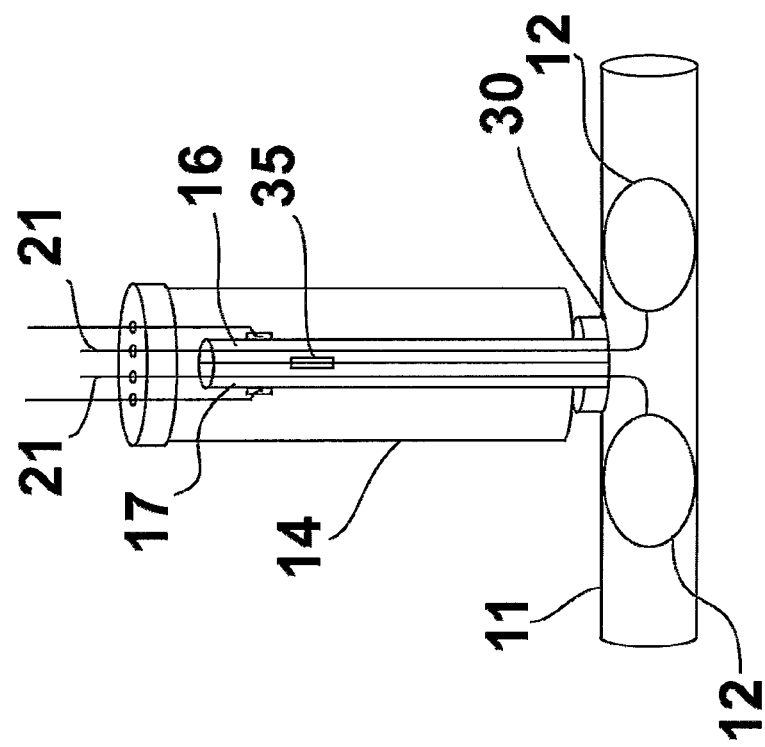

INSERTION AND REMOVAL OF INFLATABLE PIPELINE FLOW STOPPER BAGS

BACKGROUND OF THE INVENTION

1. Field of the Invention

This invention relates to the control of fluid flow in a pipe. In one aspect, this invention relates to subterranean pipes. In one aspect, this invention relates to pipes containing gaseous fluids at high pressure (greater than about 60 psig). In another aspect, this invention relates to a method and apparatus for interrupting fluid flow in subterranean pipes. In yet another aspect, this invention relates to repair of subterranean pipes from above ground.

2. Description of Related Art

The repair of fluid transmitting subterranean pipes is an ongoing necessity and typically requires access to the pipe, preferably without excavation of the surrounding area, an opening into the pipe, and some means of interrupting the fluid flow within the pipe to enable the necessary repair without fluid escaping from inside the pipe. Such repairs may include eliminating a leak, replacing a section of pipe, or replacing auxiliary equipment, such as gas meters.

The use of inflatable gas pipe stoppers or bags for interrupting the flow of gas through a pipeline or service line is well established. Such stoppers are typically employed for temporarily interrupting the flow of gas (or water) through the pipeline or service line while repairs to the pipeline or service line are effected. See, for example, U.S. Pat. No. 1,760,750 to Goodman which teaches a flexible inflatable stopper for gas and water mains that forms a complete closure for the main. In addition, if the stopper buckles or otherwise becomes deformed upon insertion, the placement of the closure will not be prevented. U.S. Pat. No. 1,946,138 to Gardner teaches a pneumatic stopper for a gas pipe including an air bag for stopping the pipe. The device includes a tubular housing and an inflatable bag, interconnected with an air tube which extends within the tubular housing. The air tube and bag may be moved downward with respect to the tubular housing to extend into the pipe after the housing has been threadably attached to the pipe. The air bag may then be inflated to stop flow within the pipe. And, U.S. Pat. No. 3,824,864 to Reigel et al. teaches a line stopper comprising a housing that is mountable to a conventional pipe tapping machine and a bag insertion assembly mounted in the housing. The insertion assembly includes a slidable insertion tube and an inflatable bag connected at the lower end thereof. The bag includes a rigid neck connected by a knuckle means to the insertion tube to enable the bag to be pivoted into the pipe. The housing is secured to the valve assembly by two pairs of ears which extend outward from the base and which are clamped to the valve assembly by bolts. When the bag is placed in the pipe, the insertion tube covers the edge of the hole in the pipe to prevent abrasion between the bag and the edge of the hole in the pipe.

In the natural gas industry, present day pipe flow stopping equipment is substantially the same equipment that the industry has been using for the last 50 years. The equipment is heavy, requiring multiple people or mechanical assists to maneuver, costly to maintain, and very time consuming when installing necessary fittings. Thus, new pipe stopping equipment that can address these problematic issues, while providing the same assurance of safety and performance, could save significant time and money during day to day operations.

Vintage plastic piping systems such as Aldyl-A and PVC materials require an alternative to squeeze-off and other stop-off means because many of these materials cannot or should not be squeezed to control the flow.

Another area of need is cast iron pipe systems that operate at pressures greater than about 5 psig. Current bag stopping equipment can only be used up to 5 psig. As a result, when cast iron systems are operating at higher pressures, the pressure in the system must first be lowered to less than 5 psig to enable conventional stopper bags to be employed. One alternative to lowering the pressure in such pipes is to use traditional stopping equipment and install heavy and expensive mechanical fittings that typically require reinforcement under the pipe to minimize the risk of future pipe breaks. However, both of these options require the use of larger excavations.

SUMMARY OF THE INVENTION

It is, thus, one object of this invention to provide a method and apparatus for interrupting the flow of fluid in a pipe which addresses the above discussed issues.

This and other objects of this invention are addressed by an apparatus for fluid flow control, including flow stoppage, in a pipe comprising a saddle fitting having an axially extending outer launch tube and a coaxially aligned inner launch tube longitudinally split into two inner launch tube halves, which are adjustable between an insertion position and a withdrawal position, disposed within the axially extending outer launch tube. At least one inflatable flow stopper bag is disposed within the inner launch tube for stopping flow of a fluid through the pipe with which the saddle fitting is connected. An inner launch tube control rod for manipulating each of the inner launch tube halves during the inflatable stopper bag insertion and removal processes is connected with each of the inner launch tube halves, and a flow stopper bag control rod for manipulating the inflatable flow stopper bags is connected with each of the inflatable flow stopper bags. The end of the axially extending outer launch tube distal from the saddle fitting is closed off by a suitable closing element which forms a plurality of openings receiving each of the control rods.

In use, the saddle fitting having an axially extending outer launch tube is attached to the pipe and a pipe opening aligned with the axially extending outer launch tube is formed in the pipe. The inner launch tube longitudinally split into two inner launch tube halves latched together and having a stopper bag insertion end opening and a stopper bag withdrawal end opening and containing at least one inflatable stopper bag suitable for withstanding a fluid pressure inside the pipe up to about 120 psi is inserted into the axially extending outer launch tube and through the pipe opening. The at least one inflatable stopper bag is inserted through the insertion end of the inner launch tube and into the pipe following which the inflatable stopper bag is inflated sufficiently to stop fluid flow within the pipe. Once the necessary repairs have been made, removal of the at least one inflatable stopper bag from the pipe is achieved by removing the inner launch tube from within the pipe opening and separating the two inner launch tube halves, thereby increasing the space there between. The at least one inflatable stopper bag is then deflated and pulled through the pipe opening into the space between the inner launch tube halves. Due to the volume of material used to make the inflatable stoppers bags, it would not be possible to withdraw the deflated stopper bag into the inner launch tube without separating the inner launch tube halves to provide a larger space for the stopper bags.

BRIEF DESCRIPTION OF THE DRAWINGS

These and other objects and features of this invention will be better understood from the following detailed description taken in conjunction with the drawings, wherein:

FIG. 2 is a schematic side view of the apparatus of FIG. 1 in which the inflatable stopper bags have been deployed;

FIG. 3 is a schematic side view of the apparatus of FIG. 2 in which the inflatable stopper bags have been retrieved into the inner launch tube;

DETAILED DESCRIPTION OF THE PRESENTLY PREFERRED EMBODIMENTS

Figure 1:
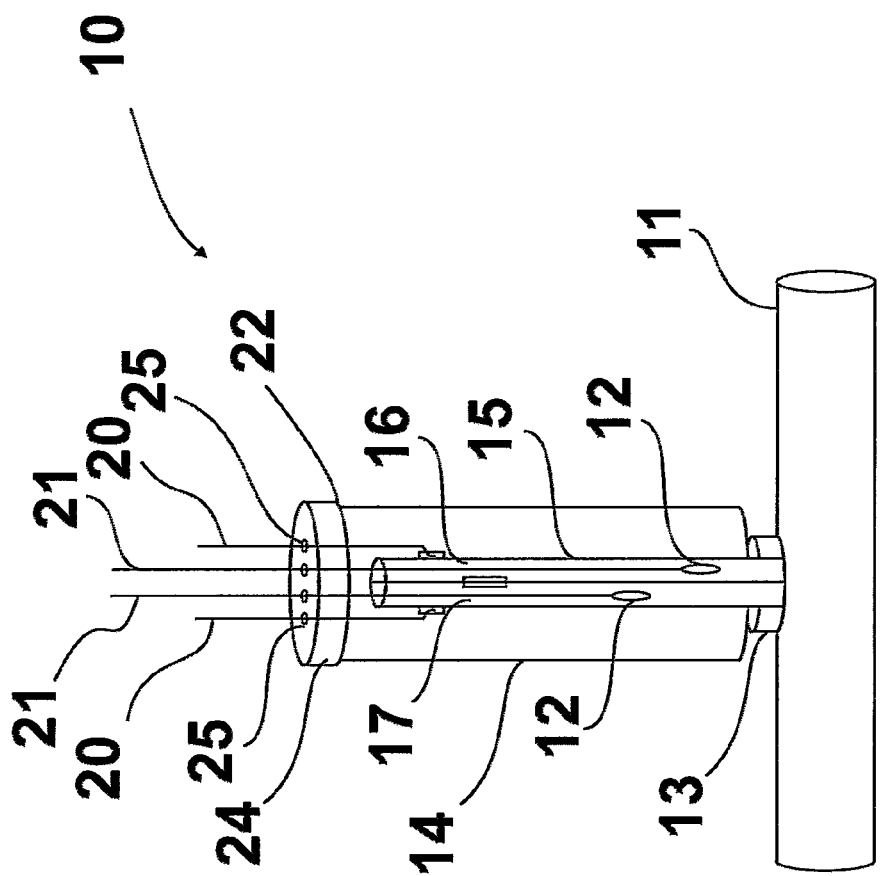
FIG. 1 is a schematic side view of an apparatus for flow control in a pipe in accordance with one embodiment of this invention in which the inflatable stopper bags are disposed within the inner launch tube.

The apparatus of this invention is a component of a system employable for repairing in-service pipes through which a fluid is flowing. The apparatus is suitable for use with pipes containing gaseous and/or liquid fluids. The system utilizes a flexible inflatable stopper bag positioned in the pipe as a means for stopping the normal fluid flow through the pipe. Depending upon the nature of the required repair a single inflatable stopper bag may be employed to stop fluid flow up stream of a repair site, or two inflatable stopper bags may be used to isolate the repair site between the inflatable stopper bags.

As previously indicated, the use of inflatable stopper bags for interrupting fluid flow through a pipe is well known, but their use is generally limited to lower pressure applications, less than 60 psig and typically less than 5 psig. These limitations are the result, in part, of the materials used to make the bags as well as the structural integrity of the bags, particularly in the connection between the inflatable stopper bag and the supply tube through which the inflation medium is provided into the inflatable stopper bag. The inflatable stopper bags employed in accordance with one embodiment of this invention are able to withstand pressures up to at least 120 psig and preferably up to about 250 psig. However, the materials used to make such inflatable stopper bags are such that the volume of space occupied by the bags after having been deployed and deflated is larger than the deflated volume prior to deployment. Thus, although the deflated stopper bags are readily insertable into a launch tube for inserting the bags into the pipe, once the inflated bags in the pipe have been deflated, it is no longer possible to retrieve the bags into the launch tube because they cannot be compacted to the extent required. However, the use of an inner launch tube split longitudinally into two halves in accordance with the method and apparatus of this invention increases the space available for retrieving the deflated bags into the inner launch tube for removal. It is to be understood that, although intended for use with such high pressure inflatable stopper bags, the apparatus of this invention may also be employed for inserting and retrieving lower pressure inflatable stopper bags and such uses are to be understood to be within the scope of this invention.

It will be appreciated by those skilled in the art that insertion of a flexible inflatable stopper bag into an in-service pipe requires the creation of an opening in the pipe through which the inflatable stopper bag may be inserted into the pipe prior to inflation. The steps and tools for tapping into an in-service pipe are well known to those skilled in the art and such steps and tools by themselves are not deemed to be elements of the method and apparatus of this invention. That is, methods for tapping into a pipe through which a fluid is flowing generally employ a fitting disposed around the area of the pipe in which the opening is made, a tool for cutting an opening in the pipe which does not allow fluid to escape from the pipe during the cutting operation, and additional tools for further refinement of the opening, such as threading of the opening, to permit accommodation of the desired addition to the pipe system, such as the addition of a service branch.

FIG. 1 shows an apparatus 10 in accordance with one embodiment of this invention connected with a pipe 11. The apparatus comprises a saddle fitting 13 having an axially extending outer launch tube 14 and a coaxially aligned inner launch tube 15 longitudinally split into two inner launch tube halves 16, 17 which are adjustable between an insertion position shown in FIG. 1 and a withdrawal position shown in FIG. 3 disposed within the axially extending outer launch tube. Disposed within the inner launch tube are two deflated, inflatable stopper bags 12. An inner launch tube control rod 20 for controlling the inner launch tube during stopper insertion and retrieval is connected with each of the inner launch tube halves 16, 17. Similarly, a flow stopper bag control rod 21 for controlling the insertion and retrieval of the inflatable stopper bags is connected with each of the inflatable flow stopper bags. An end 22 of the axially extending outer launch tube 14 distal from the saddle fitting 13 is closed off by an end closing element 24 which forms a plurality of openings 25 through which each of the control rods 20, 21 extends.

As shown in FIG. 2, in order that the inflatable stopper bags may be inserted into the pipe, the bags need to be collapsed and inserted into the split inner launch tube. Thereafter, the split inner launch tube, shown in an insertion position, with the inflatable stopper bags inside, is lowered down through the access fitting or saddle fitting 13 into the pipe 11. The inflatable stopper bags are deployed by independent flow stopper bag control rods 21 into the pipe following which the bags are inflated as necessary to shut down fluid flow through the pipe. Once the inflatable stopper bags have been deployed and inflated, the split inner launch tube may be pulled upwards back inside the axially extending outer launch tube 14 by using the independent inner launch tube control rods 20 attached to both sides of the split inner launch tube. To retrieve the inflated stopper bags, the split inner launch tube is separated, in accordance with one embodiment of this invention, by pulling upwards on one of the inner launch tube control rods while pushing downward on the other inner launch control rod, resulting in disengagement of the latch mechanism holding the two inner launch tube halves together.

Figure 4:
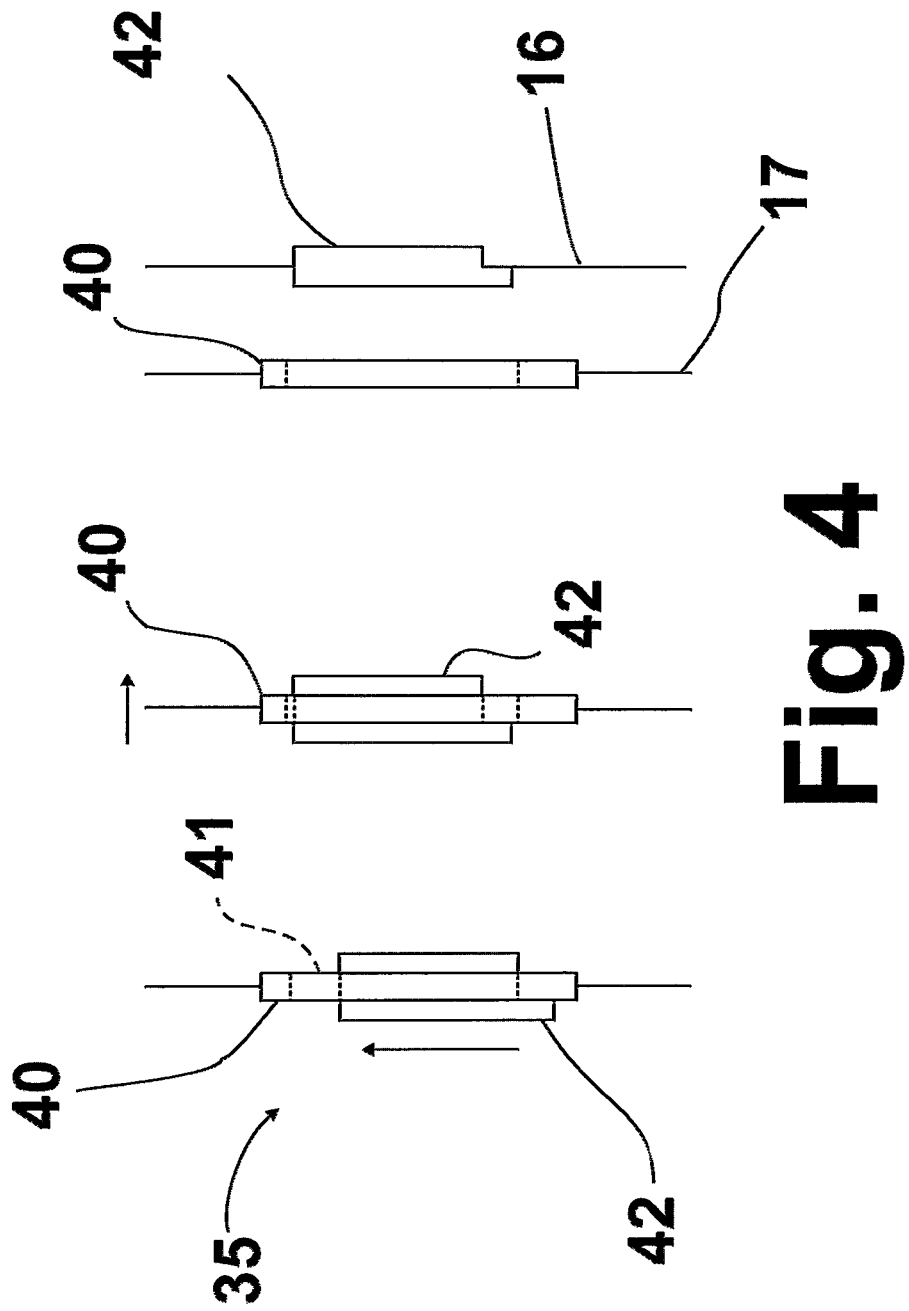
FIG. 4 is a diagram showing a latching mechanism for latching the inner launch tube halves together in accordance with one embodiment of this invention.

A latching mechanism in accordance with one embodiment of this invention operating in the aforementioned manner is shown in FIG. 4. As shown therein, the latching mechanism comprises two components, a slotted plate 40 having slot 41 connected with one of the inner launch tube halves and a hooked tongue 42 connected with the other inner launch tube half which slides through the slot of the slotted plate and engages the bottom portion of the plate to prevent the inner launch tube halves from separating. Thus, by pulling upwards on the inner launch tube half to which the hooked tongue is connected and/or pushing downward on the inner launch tube half to which the slotted plate is connected, the hook of the tongue disengages from the slotted plate, thereby allowing removal of the hooked tongue from the slot and separation of the two inner launch tube halves. It will be appreciated by those skilled in the art that other types of fasteners, such as clasps, may be employed for the purpose of holding the two inner launch tube halves together, and such other types of fasteners are deemed to be within the scope of this invention.

FIG. 2 shows the apparatus in accordance with one embodiment of this invention wherein the inflatable stopper bags 12 have been inserted into the pipe 11 and inflated to stop fluid flow through the pipe. As shown the flow stopper bag control rods 21 have been pushed toward the pipe, thereby forcing the compact deflated stopper bags through the pipe opening 30 into the interior of the pipe. Also as shown, during the insertion process, the inner launch tube halves 16, 17 remain latched together by a latching mechanism 35.

FIG. 3 shows the apparatus in accordance with one embodiment of this invention following retrieval of the inflatable stopper bags 12, shown in a deflated mode. To accommodate the deflated bags, the two inner launch tube halves 16, 17, shown in a withdrawal position, have been separated to make room for the retrieval of the deflated bags into the launch tube.

One of the benefits of the apparatus of this invention is that it enables the use of equipment that is smaller compared with conventional line stopping equipment and it enables the use of smaller tap holes, known as "keyholes", than used by conventional equipment. As a result, no significant excavation of the site surrounding the pipe of concern is required and access to the pipe and deployment of the inflatable stopper bags may be accomplished through the keyholes, i.e. holes in the ground typically less than or equal to about 18 inches in diameter.

As previously indicated, the apparatus of this invention is particularly suitable for use with heavy duty inflatable stopper bags able to withstand pressures of at least 120 psig up to about 250 psig within the pipe. One of the problems with conventional inflatable stopper bags is leakage at high pressures, particularly around the interface between the inflatable stopper bag material and the delivery means, such as a tube, through which a suitable gas for inflation of the stopper bag is provided.

Figure 5:
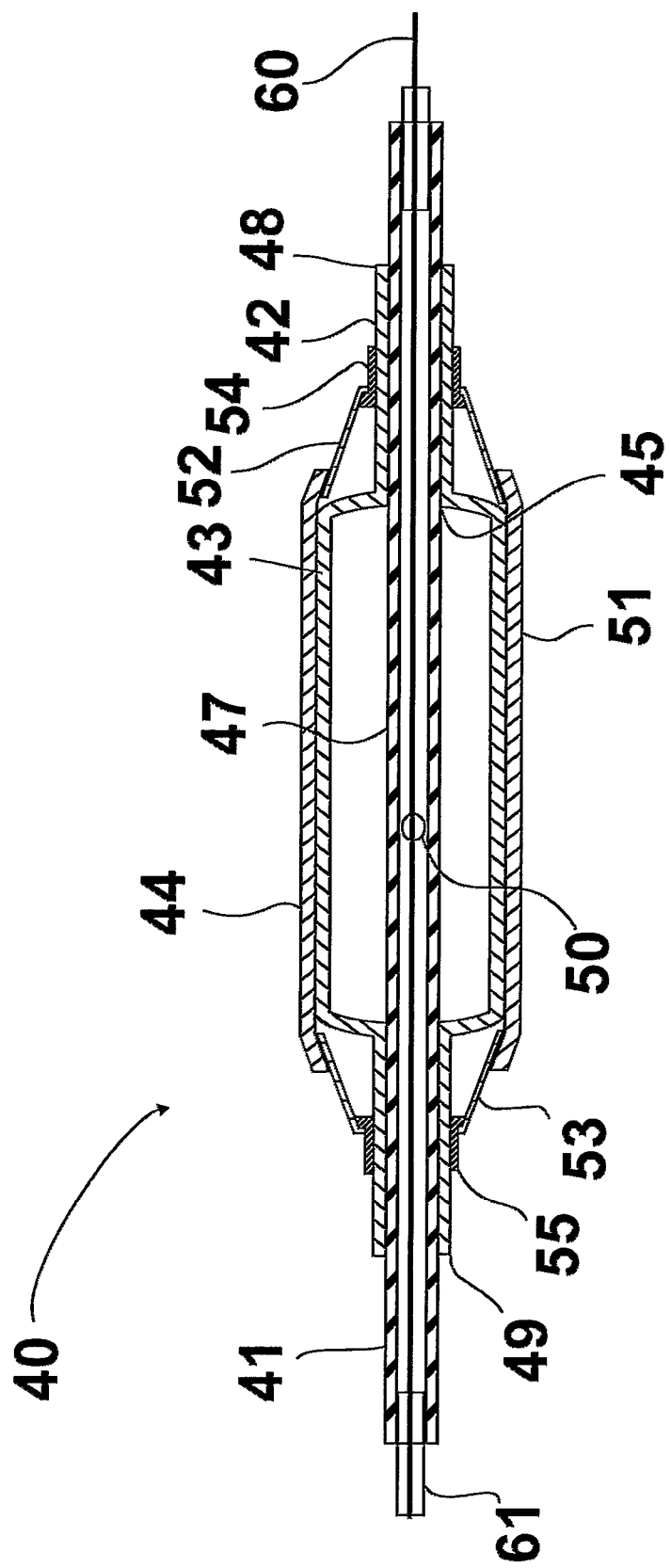
FIG. 5 is a lateral cross-sectional view of an inflatable stopper bag in accordance with one embodiment of this invention.

An inflatable stopper bag suitable for use in the method of this invention, which is able to withstand pressures up to about 250 psig, is shown in FIG. 5. The inflatable stopper bag 40 having a front end 41 and a back end 42 comprises an outer bladder 44 made of a ballistic nylon material and an inner bladder 43 adhered to the inside surface of the outer bladder. The inner bladder forms a fluid inlet opening 45 proximate the back end of the inflatable stopper bag through which a fluid for inflation of the inner bladder may be introduced and removed. The stopper further comprises polyurethane tubing 47 extending through the inner bladder and beyond the ends 48, 49 of the inner bladder. To maintain the tubing in place, the tubing is radio-frequency (RF) welded to the inner bladder inlet end and inner bladder outlet end of the inner bladder. Such RF welding produces leak-proof seals between the tubing and the inner bladder inlet and outlet ends of the inner bladder, thereby preventing the leakage of fluid from inside the inner bladder. The section of tubing inside the inner bladder forms at least one opening 50 through which a fluid for inflating the inner bladder may be provided and through which the fluid may be removed from inside the inner bladder. It is to be understood by those skilled in the art that other methods of producing leak-proof seals substantially equivalent in performance to the seals produced by RF welding may be employed, and such other methods are deemed to be within the scope of this information.

The outer bladder comprises a main body 51, inlet and outlet end cone-shaped pieces 52, 53 which are RF welded to the main body, and a polyurethane connector 54, 55 connected by RF welding with each cone-shaped piece. As previously indicated, the inner bladder is adhered to the inside surface of the outer bladder. The purpose of this adherence is to enable the pulling of a vacuum on the entire bag for deflation and subsequent removal from the pipe. Without this ability, some bags may not be removable from the pipe.

Adherence of the inner bladder to the inside surface of the outer bladder is achieved by the application of an adhesive coating to the outside surface of the inner bladder prior to insertion into the outer bladder. Suitable adhesives for use as an adhesive coating include, but are not limited to polyurethane adhesives. With the inner bladder in place, the ends of the polyurethane tubes running through the inner bladder extend through the polyurethane connectors connected with each end of the outer bladder. After assembly of the stopper bag components, the entire inflatable stopper bag assembly is inflated and cured under pressure to set the adhesive.

In accordance with one embodiment of this invention, the inflatable stopper comprises a directional stiffener 60 inserted through one end of the polyurethane tubing and extending out the opposite end of the tubing. The directional stiffener is used to ensure that the inflatable stopper bag is inserted into the pipe in the correct direction with respect to the insertion opening, i.e. upstream or downstream of the insertion opening.

In accordance with one embodiment of this invention, a hose barb fitting 61 welded to the directional stiffener proximate the front end of the stopper bag is pushed into the polyurethane tubing 47 at the front end of the stopper, with the other end of the directional stiffener extending freely out the back end of the stopper bag. In accordance with one embodiment of this invention, a hose barb 62 having a NPT fitting is run through the directional stiffener and pressed into the polyurethane tubing at the back end of the stopper. The flow stopper bag control rod 21, in the form of a tubular structure, may then be attached to the NPT hose barb fitting through which the stopper bag may be inflated and deflated.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

What is claimed is:

1. An apparatus for fluid flow control in a pipe comprising:
   a saddle fitting having an axially extending outer launch tube;
   a coaxially aligned inner launch tube longitudinally split into two inner launch tube halves which are adjustable between an insertion position and a withdrawal position disposed within said axially extending outer launch tube;
   at least one inflatable flow stopper bag having a front end and a back end disposed within said inner launch tube for stopping flow of a fluid through a pipe with which said saddle fitting is connected;
   an inner launch tube control rod connected with each of said inner launch tube halves;
   a flow stopper bag control rod connected with each of said inflatable flow stopper bags; and
   an end closing element closing off an end of said axially extending tubular outer launch tube distal from said saddle fitting, said end closing element forming a plurality of openings receiving each of said control rods.

2. The apparatus of claim 1, wherein said at least one inflatable stopper bag comprises an outer bladder, an inner bladder disposed in said outer bladder adhered to an inner surface of said outer bladder, and an inflation fluid delivery tube disposed inside said inner bladder extending from said front end to said back end of said inflatable stopper bag and forming at least one opening providing fluid communication between an interior of said inflation fluid delivery tube and said inner bladder, said inner bladder sealingly connected with said inflation fluid delivery tube proximate said front end and said back end of said inflatable stopper bag.

3. The apparatus of claim 2, wherein said outer bladder comprises a main bladder body, a cone-shaped end piece connected with said main body proximate said front end and said back end of said inflatable stopper bag, and a tubular connector connected with each of said cone-shaped end pieces providing fluid communication between an interior and an exterior of said inflatable stopper bag.

4. The apparatus of claim 3, wherein said inflation fluid delivery tube extends through each of said tubular connectors.

5. The apparatus of claim 4 further comprising a directional stiffener disposed within said inflatable stopper bag extending at least from said front end to said back end of said inflatable stopper bag.

6. The apparatus of claim 3, wherein said inner bladder is sealingly connected with said inflation fluid delivery tube by a weld produced by RF welding.

7. The apparatus of claim 3, wherein said main bladder body is connected with said cone-shaped end pieces and said tubular connectors are connected with said cone-shaped pieces by welds produced by RF welding.

8. The apparatus of claim 2, wherein said outer bladder is made of a ballistic nylon material.

9. The apparatus of claim 1, wherein said inner launch tube has a launch tube diameter less than about one-half a diameter of said axially extending outer launch tube.

10. The apparatus of claim 1 further comprising at least two latches disposed on opposite sides of said inner launch tube for maintaining said inner launch tube halves in said insertion position.

11. A method for stopping fluid flow in a pipe comprising the steps of:
    attaching a saddle fitting having an axially extending outer launch tube to said pipe;
    forming a pipe opening in said pipe aligned with said axially aligned outer launch tube;
    inserting an inner launch tube having a stopper bag insertion end opening and a stopper bag withdrawal end opening containing at least one inflatable stopper bag suitable for withstanding a fluid pressure inside said pipe up to about 250 psig into said axially extending outer launch tube, said inner launch tube longitudinally split into two inner launch tube halves latched together;
    inserting said at least one inflatable stopper bag through said insertion end of said inner launch tube through said pipe opening and into said pipe; and
    inflating said inflatable stopper bag sufficiently to stop fluid flow within said pipe.

12. The method of claim 11 further comprising deflating said at least one inflatable stopper bag, unlatching said two inner launch tube halves, separating said inner launch tube halves to produce an enlarged stopper insertion end opening, and withdrawing said at least one inflatable stopper bag from said pipe, through said pipe opening and into a space between said inner launch tube halves.

13. The method of claim 11, wherein said inner launch tube contains two inflatable stopper bags.

14. The method of claim 11, wherein said at least one stopper bag is constructed of a ballistic nylon material.

15. The method of claim 11, wherein said pipe is underground and access to said pipe is through a hole in the ground having a diameter up to about 18 inches.

16. The method of claim 11, wherein said inflatable stopper bag is able to withstand pressures in said pipe up to about 250 psig.

* * * * *